United States Patent
Saeki et al.

(10) Patent No.: US 6,571,766 B2
(45) Date of Patent: Jun. 3, 2003

(54) IDLE SPEED CONTROLLER FOR INTERNAL COMBUSTION ENGINE

(75) Inventors: Hiroaki Saeki, Hitachinaka (JP); Kenji Watanabe, Hitachi (JP)

(73) Assignees: Hitachi, Ltd., Tokyo (JP); Hitachi Car Engineering Co., Ltd., Hitachinaka (JP)

(*) Notice: Subject to any disclaimer, the term of this patent is extended or adjusted under 35 U.S.C. 154(b) by 170 days.

(21) Appl. No.: 09/877,186

(22) Filed: Jun. 11, 2001

(65) Prior Publication Data

US 2002/0053337 A1 May 9, 2002

(30) Foreign Application Priority Data

Nov. 7, 2000 (JP) ......................................... 2000-339612

(51) Int. Cl.[7] .............................................. F02D 41/08
(52) U.S. Cl. ...................... 123/339.14; 123/339.27; 251/129.17; 251/129.16; 29/888.4
(58) Field of Search ................. 123/339.14, 339.27; 251/129.16, 129.17; 29/888.4, 890.12

(56) References Cited

U.S. PATENT DOCUMENTS

| | | | | |
|---|---|---|---|---|
| 4,580,536 A | * | 4/1986 | Takao et al. | ............ 123/339.27 |
| 4,662,604 A | * | 5/1987 | Cook | ...................... 251/129.17 |
| 4,989,564 A | * | 2/1991 | Cook et al. | ............. 123/339.27 |
| 5,070,838 A | * | 12/1991 | McKay | ................... 123/339.27 |
| 5,188,073 A | | 2/1993 | Ejiri et al. | |
| 5,462,253 A | * | 10/1995 | Asthana et al. | ......... 251/129.16 |
| 5,467,749 A | * | 11/1995 | Meiwes et al. | ......... 123/339.27 |
| 5,497,746 A | * | 3/1996 | Semence et al. | ........ 123/339.27 |
| 5,564,388 A | * | 10/1996 | Meiwes et al. | ......... 123/339.27 |
| 5,649,512 A | * | 7/1997 | Flanery et al. | .......... 123/339.27 |
| 6,065,447 A | * | 5/2000 | Saeki et al. | ............. 123/339.27 |
| 6,357,403 B1 | * | 3/2002 | Yano | ....................... 123/339.14 |

FOREIGN PATENT DOCUMENTS

JP          11-230011          8/1999

* cited by examiner

*Primary Examiner*—Erick Solis
(74) *Attorney, Agent, or Firm*—Dickstein Shapiro Morin & Oshinsky LLP

(57) ABSTRACT

The present invention provides an idle speed controller comprising a guide plate having a spigot portion fixedly attached to a cylindrical projected portion of a solenoid coil assembly for guiding a shaft to and away from a plunger wherein a symmetrical central axis is maintained between the shaft and the plunger during the guiding of the shaft.

56 Claims, 2 Drawing Sheets

IDLE SPEED CONTROLLER FOR INTERNAL COMBUSTION ENGINE

FIELD OF THE INVENTION

The present invention relates to an idle speed controller for internal combustion engine, in particular, an idle speed controller having enhanced stability of flow rate control.

DISCUSSION OF THE RELATED ART

Conventionally, an idle speed controller comprises a solenoid coil assembly fitted in an inner peripheral portion of a solenoid case, and a guide plate press fitted in another inner peripheral portion of the solenoid case. The solenoid case is crimped to a valve body, and the guide plate serving as a sliding guide for a valve shaft to a plunger is independent from the solenoid coil assembly. In other words, the solenoid coil assembly and the guide plate are never directly connected.

These idle speed controllers are problematic because the dimensional tolerances of the component parts accumulate to lower the accuracy of the central axis between the sliding valve shaft and the electromagnetic solenoid plunger. Thus, the control of an opening area of an orifice formed at the tip of the valve shaft becomes highly unstable. Consequently, flow rate control is hard to regulate.

SUMMARY OF THE INVENTION

An object of the present invention is to provide an idle speed controller for internal combustion engine having enhanced stability of flow rate control.

In an object of the present invention an idle speed controller is provided comprising a valve portion comprising a shaft for intake of auxiliary air and a solenoid portion comprising a plunger for driving the shaft and a solenoid coil assembly having a plunger guide portion for guiding the plunger, the assembly further comprising a cylindrical projected portion. The invention further provides a guide plate having a spigot portion fixedly attached to the cylindrical projected portion of the assembly and a shaft guide portion for guiding the shaft wherein a symmetrical central axis is maintained between the shaft and the plunger.

In another object of the present invention an idle speed controller is provided comprising a guide plate having a spigot portion fixedly attached to a cylindrical projected portion of a solenoid coil assembly for guiding a shaft to and away from a plunger wherein a symmetrical central axis is maintained between the shaft and the plunger during the guiding of the shaft.

In another object of the present invention an idle speed controller is provided comprising a guide plate having a spigot portion fixedly attached to a cylindrical projected portion of a solenoid coil assembly for guiding a valve portion to and away from a solenoid portion wherein a symmetrical central axis is maintained between the valve portion and the solenoid portion during the guiding of the valve portion.

In yet another object of the present invention an idle speed controller is provided comprising a valve portion comprising a shaft for intake of auxiliary air, a solenoid portion comprising a plunger for driving the shaft and a solenoid coil assembly having a plunger guide portion for guiding the plunger, the assembly further comprising a cylindrical projected portion. The invention further provides a guide plate having a spigot portion fixedly attached to the cylindrical projected portion of the assembly and a shaft guide portion for guiding the shaft wherein a symmetrical central axis is maintained between the shaft and the plunger wherein an O-ring is provided in the spigot portion.

In another object of the present invention an idle speed controller is provided comprising a guide plate having a spigot portion fixedly attached to a cylindrical projected portion of a solenoid coil assembly for guiding a valve portion to and away from a solenoid portion wherein a symmetrical central axis is maintained between the valve portion and the solenoid portion during the guiding of the valve portion. The invention further provides a solenoid case having a first flange portion in the solenoid portion, a valve body having a second flange portion in the valve portion wherein the guide plate further comprising a third flange portion and the flange portions are all crimped together.

In another object of the present invention a method of manufacturing an idle speed controller is provided comprising the steps of providing a valve portion comprising a shaft for intake of auxiliary air and providing a solenoid portion comprising a plunger for driving the shaft and a solenoid coil assembly having a plunger guide portion for guiding the plunger, the assembly further comprising a cylindrical projected portion. The method further provides the step of fixedly attaching a guide plate having a spigot portion to the cylindrical projected portion of the assembly and a shaft guide portion for guiding the shaft wherein a symmetrical central axis is maintained between the shaft and the plunger.

In another object of the present invention a method of manufacturing an idle speed controller is provided comprising the steps of fixedly attaching a guide plate having a spigot portion to a cylindrical projected portion of a solenoid coil assembly for guiding a shaft to and away from a plunger wherein a symmetrical central axis is maintained between the shaft and the plunger during the guiding of the shaft.

In another object of the present invention a method of manufacturing an idle speed controller is provided comprising the steps of fixedly attaching a guide plate having a spigot portion to a cylindrical projected portion of a solenoid coil assembly for guiding a valve portion to and away from a solenoid portion wherein a symmetrical central axis is maintained between the valve portion and the solenoid portion during the guiding of the valve portion.

In yet another object of the present invention a method of manufacturing an idle speed controller is provided comprising the steps of providing a valve portion comprising a shaft for intake of auxiliary air and providing a solenoid portion comprising a plunger for driving the shaft and a solenoid coil assembly having a plunger guide portion for guiding the plunger, the assembly further comprising a cylindrical projected portion. The method further includes the steps of fixedly attaching a guide plate having a spigot portion to the cylindrical projected portion of the assembly and a shaft guide portion for guiding the shaft wherein a symmetrical central axis is maintained between the shaft and the plunger wherein an O-ring is provided in the spigot portion.

In another object of the present invention a method of manufacturing an idle speed controller is provided comprising the steps of fixedly attaching a guide plate having a spigot portion to a cylindrical projected portion of a solenoid coil assembly for guiding a valve portion to and away from a solenoid portion wherein a symmetrical central axis is maintained between the valve portion and the solenoid portion during the guiding of the valve portion. The method further provides the steps of providing a solenoid case having a first flange portion in the solenoid portion and providing a valve body having a second flange portion in the valve portion wherein the guide plate further comprising a third flange portion and crimping the flange portions together.

BRIEF DESCRIPTION OF THE DRAWINGS

The above advantages and features of the invention will be more clearly understood from the following detailed description which is provided in connection with the accompanying drawings.

DETAILED DESCRIPTION OF THE INVENTION

Figure 1:
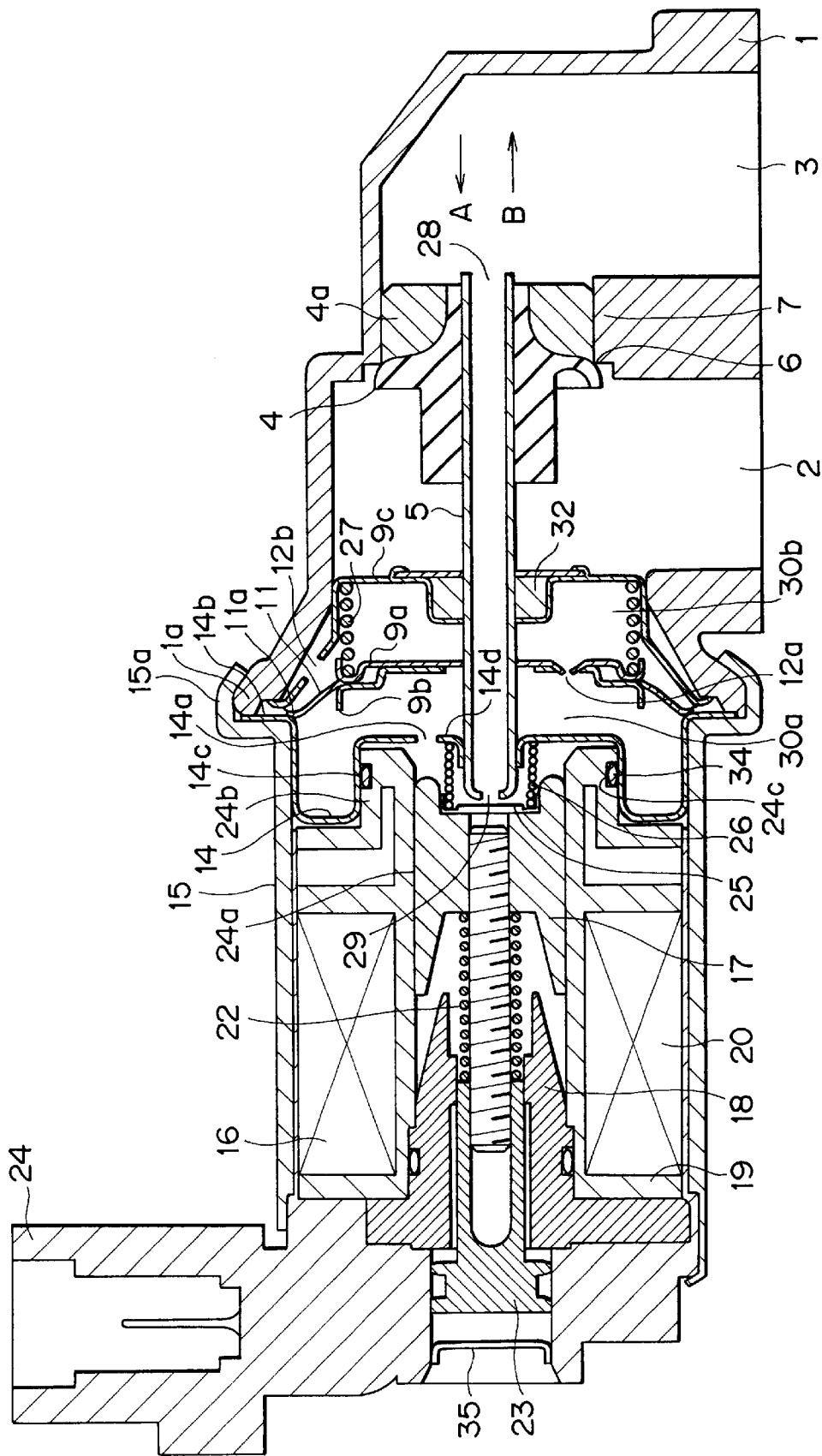
FIG. 1 is a sectional view of an idle speed controller for internal combustion engine according to the present invention.

Exemplary embodiment of the present invention will be described below in connection with the drawings. Other embodiments may be utilized and structural or logical changes may be made without departing from the spirit or scope of the present invention. Like items are referred to by like reference numerals throughout the drawings.

Referring now to the drawings, FIG. 1 is a sectional view of the idle speed controller for internal combustion engine according to the present invention comprising a body 1 which comprises a seat portion 6 primarily disposed from the center to the right side of FIG. 1, and a solenoid portion 16 primarily disposed on the left side of FIG. 1 and driving a valve portion 4.

As contrasted to a main intake passage in which a throttle valve is disposed, the body 1 defines auxiliary air passages 2 and 3. The auxiliary air passage 2 is connected to the upstream side of the throttle valve, and serves as an inflow passage. The auxiliary air passage 3 is connected to the downstream side of the throttle valve, and serves as an outflow passage 3.

The valve portion 4 is molded from resin, and is fitted to one end of a hollow shaft 5. In the condition shown in FIG. 1, the valve portion 4 is in contact with the seat portion 6 of the body 1, whereby communication between the inflow passage 2 and the outflow passage 3 is interrupted, namely, the valve portion 4 is closed. When the shaft 5 is moved in the direction of arrow A, the inflow passage 2 and the outflow passage 3 communicate with each other, namely, the valve portion 4 is opened. A guide portion 4a disposed integrally with the valve portion 4 is provided in a cylindrical passage 7. When the shaft 5 is moved in the directions of arrows A and B, the guide portion 4a guides the sliding at the right end portion of the shaft 5.

Figure 2:
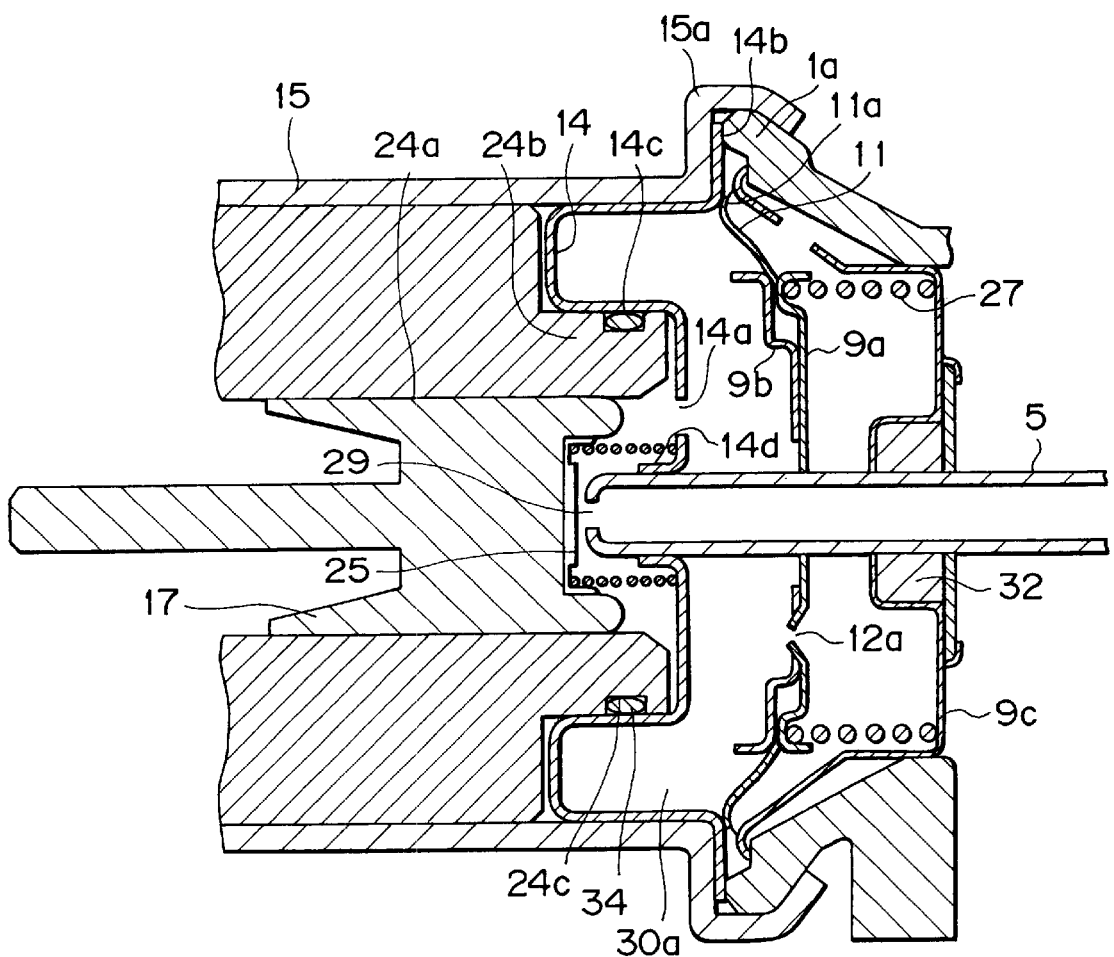
FIG. 2 is an enlarged sectional view of a part of FIG. 1.

As enlargedly shown in FIG. 2, the shaft 5 is guided at its left end portion by a guide plate 14 having a flange portion 14b which is crimped to a solenoid case 15, and is guided at its central portion by a rubber damper 32. The rubber damper 32 is held by a plate 9c. The shaft 5 is provided at its left end portion with a pilot port (orifice) 29, whereby inflow of a negative pressure flowing in from an open port 28 at the right end portion of the shaft 5 in FIG. 1 is restricted. An orifice 12a provided in plates 9a and 9b and restricts air flowing from a right side space 30b into a left side space 30a which are partitioned by the plates 9a, 9b and a diaphragm 11.

As shown in FIG. 2, the shaft 5 is press fitted into the plates 9a and 9b which are attached by welding. An inner circumferential portion of the diaphragm 11 is clamped between the plate 9a and the plate 9b. An outer circumferential portion of the diaphragm 11 is clamped, and hermetically fixed, between the body 1, the guide plate 14 and the solenoid case 15.

A spring 27 is disposed between the plate 9a and plate 9c. The spring 27 with a recoil strength urges plate 9a and shaft 5 in the direction of arrow A (opening direction of the valve portion 4). The guide plate 14 is provided at its central portion with a cylindrical portion, which supports and guides a left end portion of the shaft 5. The guide plate 14 has a plurality of holes 14a.

Where only a spring 22 and a spring 26 for pressing a plunger 17 from both sides are provided, the plunger 17 is urged in the direction of arrow B (closing direction of the valve portion 4) and the valve portion 4 is closed, because the urging force of the spring 22 is greater. However, by additionally providing the spring 27, adjustment is made so that the valve portion 4 is opened even when the engine is stopped. This arrangement prevents the valve portion 4 from adhering to the body 1 and being closed, and for preventing deformation of the valve portion due to the adhesion of carbon stain, gum material of gasoline or the like. Under this arrangement, the shaft 5 is urged by the force of the spring 27 in the direction of the control seat 25, so that the shaft 5 can follow up the control seat 25 even when the negative pressure on the side of the outflow passage 3 is weak or absent.

When the engine is operated, a negative pressure arises on the downstream side of the valve portion 4. The force pulling the valve portion 4 in the closing direction by the negative pressure is greater than the resultant force of the springs urging the valve portion 4 in the opening direction, so that the valve portion 4 is closed. Therefore, while the engine is operating, the valve portion 4 is not opened unless an electric current not less than a certain value is passed through a solenoid 16.

The solenoid portion 16 is provided in the solenoid case 15. The solenoid portion 16 comprises the plunger 17, a core 18, a bobbin 19, the spring 22, solenoid coil assembly 24 and an adjusting screw 23. The plunger 17 is movable in the axial direction. The core 18 attracts the plunger 17. The solenoid coil assembly 24 slidably holds the plunger 17, and holds an annular coil 20. The spring 22 is so disposed as to resist an attracting force for the plunger 17. The adjusting screw 23 adjusts a set load of the spring 22, and supports a shaft portion on the left side of the plunger 17 by a bearing hole disposed at its center. A plug 35 is fitted in an opening portion where the adjusting screw 23 is disposed. The plug 35 serves to water-proof and dust-proof the solenoid portion 16 after the adjustment of the set load of the spring 22.

The guide plate 14 serving as a sliding guide for the shaft 5 is press fitted and attached to the solenoid case 15. The guide plate 14 has a flange portion 14b at its outer circumference, so that when the guide plate 14 is press fitted into the solenoid case 15, the flange portion 14b is crimped to a flange portion 15a of the solenoid case, whereby press fit position is determined. The flange portion 14b of the guide plate, the flange portion 15a of the solenoid case and a flange portion 1a of the value body 1 are crimped together. Also, an outer peripheral portion 11a of the diaphragm 11 can be crimped at the flange portions, 14b, 15a and 1a as well. This configuration provides a seal by utilizing the outer peripheral portion 11a of the diaphragm 11 so that a negative pressure in a negative pressure chamber 30a working on the diaphragm 11 is not leaked through a gap between the guide plate 14 and the solenoid case 15.

This structure obviate the necessity for providing a partition wall portion for press fit positioning of the guide plate at an intermediate portion of the solenoid case. Conventionally, the solenoid case has been formed by joining two parts, a case and a cover, by welding, so that dimensional changes would occur at the time of welding, resulting in instability of dimensional accuracy of the product. Furthermore, imperfect air-tightness of the welded portion would easily occur, so that production steps such as air-tightness test have been necessary. According to the present invention, the solenoid case 15 is a single press worked part, so that there is no risk of dimensional changes or air leakage arising from welding, and good dimensional accuracy can be obtained. In other words, solenoid case 15 is one piece as opposed to at least two pieces, integrated into one piece.

Further, the guide plate 14 is provided with a spigot portion 14c to which the solenoid coil assembly 24 can be fitted. On the other hand, while the plunger 17 slides inside the solenoid coil assembly 24, a cylindrical projected portion 24b for fitting to the spigot portion 14c of the guide plate is provided on the outer peripheral side of a plunger guide portion 24a serving as a sliding guide for the plunger 17. The cylindrical projected portion 24b is molded as one body with the plunger guide portion 24a, so that a high coaxial dimensional accuracy can be obtained. In other words, the spigot portion 14c of the guide plate 14 is fixedly attached to a cylindrical projected portion 24b of the solenoid coil assembly 24. Hence, the guide plate 14 is directly connected to the assembly 24. Note, although the connection is described as being fixedly attached, there exists at least some clearance for the movement of the plunger 17. Also, the guide plate 14 has a shaft guide portion 14d for guiding the shaft 5 to and away from the plunger 17. Hence, by this configuration, a symmetrical central axis is maintained between the shaft 5 and plunger 17 allowing enhanced stability of flow rate control. Note, as described herein, a central axis is defined as a plane at which the pilot port 29 of the shaft 5 is centrally aligned with the control seat 25 of the plunger 17. In other words, an imaginary line drawn axially through, the middle of shaft 5 also cuts through the middle of plunger 17.

Also, in order to prevent leakage of a negative pressure in the negative pressure chamber 30a at the diaphragm 11, the cylindrical projected portion 24b of the solenoid coil assembly 24 is provided with groove 24c for fitting an O-ring 34 therein. With this constitution, at the time of mounting the solenoid coil assembly 24 and the guide plate 14 in the solenoid case 15, the cylindrical projected portion 24b of the solenoid coil assembly 24 can be fitted to the spigot portion 14c of the guide plate 14. The elastic force of the O-ring 34 provides improved adhesion between the guide plate 14 and the cylindrical guide portion 24b. This configuration further enhances the alignment of the shaft 5 to the plunger 17. In other words, the central axis between the shaft 5 and plunger 17 is maintained.

A shaft guide portion 14d for holding the shaft 5 is provided at a central portion of the guide plate 14. Since the shaft guide portion 14d and the spigot portion 14c are both provided on a single element, the controller of the present invention can be formed with a good symmetrical central axis. Namely, the shaft guide portion 14d of the guide plate 14, the shaft 5 held thereby, and the plunger guide portion 24a of the solenoid coil assembly 24 can be aligned with good symmetrical central axis. In other words, the plunger 17 and the shaft 5 can be symmetrically, centrally aligned, so that when the plunger 17 is inclined in the plunger guide 24a, relative inclination and offset of the axis of the plunger 17 and the shaft 5 can be minimized.

The control seat 25 is press fitted and fixed in a recessed portion on the right side of the plunger 17. The control seat 25 is formed by baking a rubber sheet onto a surface of stainless steel material, and is so formed that the rubber sheet surface comes into contact with the left end portion of the shaft 5 where the orifice 29 is provided. The spring 26 for pushing the plunger 17 to the side of the adjusting screw 23 is provided between the guide plate 14 and the control seat 25.

Hence, the present invention provides an idle speed controller comprising a valve portion comprising a shaft for intake of auxiliary air and a solenoid portion comprising a plunger for driving the shaft and a solenoid coil assembly having a plunger guide portion for guiding the plunger, the assembly further comprising a cylindrical projected portion. The invention further provides a guide plate having a spigot portion fixedly attached to the cylindrical projected portion of the assembly and a shaft guide portion for guiding the shaft wherein a symmetrical central axis is maintained between the shaft and the plunger.

Next, operation of the idle speed control valve according to the present invention will be described. In the condition where the engine is running, an intake negative pressure is generated, and it is applied to the outflow passage 3. Therefore, the valve portion 4 is attracted by the intake negative pressure, and is moved in the direction of arrow B, whereby the outflow passage is closed.

When an electric current applied to the annular coil 20 of the solenoid portion is increased and the magnetic attractive force of the solenoid becomes greater than the force urging the plunger 17 towards the valve portion by the spring 22 and the spring 26, the plunger 17 is moved to the side of the core 18. Since the control seat 25 also is moved together with the plunger 17, the control seat 25 parts from the left end portion of the shaft 5. Then, a negative pressure applied to the inside of the hollow shaft 5 is passed through the opening port 28, the orifice 29 at the left end and the holes 14a, and is led into the negative pressure chamber 30a. By the negative pressure led into the negative pressure chamber 30a, the diaphragm 11 is pulled in the direction of arrow A in FIG. 1, and the diaphragm 11 press fitted and fixed to the plates 9a, 9b is moved towards the solenoid portion (in the direction of arrow A), whereby the valve portion 4 fitted to the shaft 5 is opened. At this time, the negative pressure applied to the diaphragm 11 passes through the orifice 12a and a hole 12b, and gradually leaks through the inflow passage 2 to the atmosphere.

When the diaphragm 11 is moved left (in the direction of arrow A) by the negative pressure and the orifice 29 at the left end portion of the shaft 5 comes into contact with and closed by the control seat 25, the negative pressure passage is interrupted. Then, the negative pressure in the negative pressure chamber 30a gradually leaks through an orifice 12a to the atmosphere, and, as the negative pressure thus decreases, the force pulling the diaphragm 11 decreases, so that the shaft 5 is moved right (in the direction of arrow B) due to the suction force in the direction of arrow B exerted by the negative pressure in the outflow passage 3. Also, the orifice 29 at the left end portion of the shaft 5 is opened, and the negative pressure is led into the negative pressure chamber 30a.

The above process is repeated, whereby the shaft 5 moves following the moved position of the plunger 17, and the shaft 5 is held at such a position that a tiny gap (about 0.05 to 0.1 mm) is formed between the control seat 25 and the orifice 29. Namely, by the self-positioning structure utilizing the intake negative pressure coming from the engine, the shaft 5 can be held at the position of the control seat 25 according to the quantity of electric current applied to the annular coil 20 of the solenoid 16. With such an intake negative pressure servo method used, the solenoid can be made small in size, as compared with the case where the shaft 5 is directly driven.

In the above constitution, the shaft 5 is supported at its left portion by the guide plate 14, is supported at its central portion by a rubber damper 32, and is supported at its right portion by the guide portion 4a of the valve portion 4. However, a clearance is present at each of the support points, and the shaft 5 is often a slightly inclined with respect to the overall center axis. In addition, the plunger 17 also is often inclined with respect to the central axis due to clearance between it and the plunger guide 24a, so that the control seat 25 is often inclined to a line orthogonal to the central axis. Therefore, the central axis of the orifice 29 at the left end portion of the shaft 5 and the central axis of the control seat 25 would not easily become aligned with each other. Further, this condition is worsened when the symmetry of the central axis of the plunger 17 and the guide plate 14 is poor. Hence, when the plunger 17 in this condition is moved due to vibration or the like, the flow rate control becomes unstable. In order to prevent such a situation, according to the present embodiment, the cylindrical projected portion 24b of the solenoid coil assembly 24 is fitted to the spigot portion 14c of the guide plate 14 whereby a symmetrical central axis of the shaft 5 and the plunger 17 is maintained.

As has been described above, according to the present embodiment, the guide plate 14 for guiding the shaft 5 is provided with the spigot portion 14c for receiving the cylindrical guide portion 24b solenoid coil assembly 24, whereby a symmetrical central axis of the solenoid plunger 17 and the shaft 5 is maintained. Therefore, the accuracy of axial positioning of the plunger 17 inside the solenoid for controlling the opening area of the orifice 29 provided at the tip of the shaft 5 is enhanced, and inclination of the plunger 17 to the shaft 5 is minimized. Accordingly, the control of the opening area of the orifice 29 is stabilized, whereby the accuracy of metering air by the valve body can be accurately controlled.

Also, the flange portions 14b, 15a and 1a provided at the outer end of the guide plate 14, solenoid case 15 and value body 1, respectively, are all crimped together. The solenoid case can be simplified from an assembly of a plurality of component parts to a single press-worked part, wherein dimensional accuracy of component parts can be enhanced, and more stable air metering can be achieved. Further, for avoiding breakage of air-tightness, the outer circumferential edge of the diaphragm 11 which drives the shaft 5 and the outer circumferential edge of the guide plate 14 may be crimped together with the solenoid case 15 as well.

Although the invention has been described above in connection with exemplary embodiments, it is apparent that many modifications and substitutions can be made without departing from the spirit or scope of the invention. Accordingly, the invention is not to be considered as limited by the foregoing description, but is only limited by the scope of the appended claims.

What is claimed as new and desired to be protected by Letters Patent of the United States is:

1. An idle speed controller comprising:
   a valve portion comprising a shaft for intake of auxiliary air;
   a solenoid portion comprising a plunger for driving said shaft and a solenoid coil assembly having a plunger guide portion for guiding said plunger, said assembly further comprising a cylindrical projected portion; and
   a guide plate having a spigot portion fixedly attached to said cylindrical projected portion of said assembly and a shaft guide portion for guiding said shaft wherein a symmetrical central axis is maintained between said shaft and said plunger.

2. The controller of claim 1 further comprising:
   a solenoid case having a first flange portion in said solenoid portion;
   a valve body having a second flange portion in said valve portion;
   said guide plate further comprising a third flange portion; and
   wherein said flange portions are all crimped together.

3. The controller of claim 2 wherein said solenoid case is one piece.

4. The controller of claim 2 further comprising a diaphragm having a fourth flange portion.

5. The controller of claim 1 further comprising an O-ring disposed in said spigot protion.

6. The controller of claim 1 wherein said controller is utilized in an internal combustion engine.

7. An idle speed controller comprising:
   a guide plate having a spigot portion fixedly attached to a cylindrical projected portion of a solenoid coil assembly for guiding a shaft to and away from a plunger wherein a symmetrical central axis is maintained between said shaft and said plunger during said guiding of said shaft.

8. The controller of claim 7 further comprising:
   a solenoid case having a first flange portion;
   a valve body having a second flange portion;
   said guide plate further comprising a third flange portion; and
   wherein said flange portions are all crimped together.

9. The controller of claim 8 wherein said solenoid case is one piece.

10. The controller of claim 8 further comprising a diaphragm having a fourth flange portion.

11. The controller of claim 7 further comprising an O-ring disposed in said spigot portion.

12. The controller of claim 7 wherein said controller is utilized in an internal combustion engine.

13. An idle speed controller comprising:
    a guide plate having a spigot portion fixedly attached to a cylindrical projected portion of a solenoid coil assembly for guiding a valve portion to and away from a solenoid portion wherein a symmetrical central axis is maintained between said valve portion and said solenoid portion during said guiding of said valve portion.

14. The controller of claim 13 further comprising:
    a solenoid case having a first flange portion in said solenoid portion;
    a valve body having a second flange portion in said valve portion;
    said guide plate further comprising a third flange portion; and
    wherein said flange portions are all crimped together.

15. The controller of claim 14 wherein said solenoid case is one piece.

16. The controller of claim 14 further comprising a diaphragm having a fourth flange portion.

17. The controller of claim 13 further comprising an O-ring disposed in said spigot portion.

18. The controller of claim 13 wherein said controller is utilized in an internal combustion engine.

19. An idle speed controller comprising:
   a valve portion comprising a shaft for intake of auxiliary air;
   a solenoid portion comprising a plunger for driving said shaft and a solenoid coil assembly having a plunger guide portion for guiding said plunger, said assembly further comprising a cylindrical projected portion; and
   a guide plate having a spigot portion fixedly attached to said cylindrical projected portion of said assembly and a shaft guide portion for guiding said shaft wherein a symmetrical central axis is maintained between said shaft and said plunger wherein an O-ring is provided in said spigot portion.

20. The controller of claim 19 further comprising:
   a solenoid case having a first flange portion in said solenoid portion;
   a valve body having a second flange portion in said valve portion;
   said guide plate further comprising a third flange portion; and
   wherein said flange portions are all crimped together.

21. The controller of claim 20 wherein said solenoid case is one piece.

22. The controller of claim 20 further comprising a diaphragm having a fourth flange portion.

23. The controller of claim 19 wherein said controller is utilized in an internal combustion engine.

24. An idle speed controller comprising:
   a guide plate having a spigot portion fixedly attached to a cylindrical projected portion of a solenoid coil assembly for guiding a valve portion to and away from a solenoid portion wherein a symmetrical central axis is maintained between said valve portion and said solenoid portion during said guiding of said valve portion;
   a solenoid case having a first flange portion in said solenoid portion;
   a valve body having a second flange portion in said valve portion;
   said guide plate further comprising a third flange portion; and
   wherein said flange portions are all crimped together.

25. The controller of claim 24 wherein said solenoid case is one piece.

26. The controller of claim 24 further comprising a diaphragm having a fourth flange portion.

27. The controller of claim 24 further comprising an O-ring disposed in said spigot portion.

28. The controller of claim 24 wherein said controller is utilized in an internal combustion engine.

29. A method of manufacturing an idle speed controller comprising the steps of:
   providing a valve portion comprising a shaft for intake of auxiliary air;
   providing a solenoid portion comprising a plunger for driving said shaft and a solenoid coil assembly having a plunger guide portion for guiding said plunger, said assembly further comprising a cylindrical projected portion; and
   fixedly attaching a guide plate having a spigot portion to said cylindrical projected portion of said assembly and a shaft guide portion for guiding said shaft wherein a symmetrical central axis is maintained between said shaft and said plunger.

30. The method of claim 29 further comprising:
   providing a solenoid case having a first flange portion in said solenoid portion;
   providing a valve body having a second flange portion in said valve portion;
   said guide plate further comprising a third flange portion; and
   crimping said flange portions together.

31. The method of claim 30 wherein said solenoid case is one piece.

32. The method of claim 30 further comprising the step of providing a diaphragm having a fourth flange portion.

33. The method of claim 29 further comprising an O-ring disposed in said spigot portion.

34. The method of claim 29 wherein said controller is utilized in an internal combustion engine.

35. A method of manufacturing an idle speed controller comprising the steps of:
   fixedly attaching a guide plate having a spigot portion to a cylindrical projected portion of a solenoid coil assembly for guiding a shaft to and away from a plunger wherein a symmetrical central axis is maintained between said shaft and said plunger during said guiding of said shaft.

36. The method of claim 35 further comprising:
   providing a solenoid case having a first flange portion;
   providing a valve body having a second flange portion;
   said guide plate further comprising a third flange portion; and
   crimping said flange portions together.

37. The method of claim 36 wherein said solenoid case is one piece.

38. The method of claim 36 further comprising the step of providing a diaphragm having a fourth flange portion.

39. The method of claim 35 further comprising an O-ring disposed in said spigot portion.

40. The method of claim 35 wherein said controller is utilized in an internal combustion engine.

41. A method of manufacturing an idle speed controller comprising the steps of:
   fixedly attaching a guide plate having a spigot portion to a cylindrical projected portion of a solenoid coil assembly for guiding a valve portion to and away from a solenoid portion wherein a symmetrical central axis is maintained between said valve portion and said solenoid portion during said guiding of said valve portion.

42. The method of claim 41 further comprising:
   providing a solenoid case having a first flange portion in said solenoid portion;
   providing a valve body having a second flange portion in said valve portion;
   said guide plate further comprising a third flange portion; and
   crimping said flange portions together.

43. The method of claim 42 wherein said solenoid case is one piece.

44. The method of claim 42 further comprising the step of providing a diaphragm having a fourth flange portion.

45. The method of claim 41 further comprising an O-ring disposed in said spigot portion.

46. The method of claim 41 wherein said controller is utilized in an internal combustion engine.

47. A method of manufacturing an idle speed controller comprising the steps of:

provinding a valve portion comprising a shaft for intake of auxiliary air;

providing a solenoid portion comprising a plunger for driving said shaft and a solenoid coil assembly having a plunger guide portion for guiding said plunger, said assembly further comprising a cylindrical projected portion; and fixedly attaching a guide plate having a spigot portion to said cylindrical projected portion of said assembly and a shaft guide portion for guiding said shaft wherein a symmetrical central axis is maintained between said shaft and said plunger wherein an O-ring is provided in said spigot portion.

48. The method of claim 47 further comprising:

providing a solenoid case having a first flange portion in said solenoid portion;

providing a valve body having a second flange portion in said valve portion;

said guide plate further comprising a third flange portion; and crimping said flange portions together.

49. The method of claim 48 wherein said solenoid case is one piece.

50. The method of claim 48 further comprising the step of providing a diaphragm having a fourth flange portion.

51. The method of claim 47 wherein said controller is utilized in an internal combustion engine.

52. A method of manufacturing an idle speed controller comprising the steps of:

fixedly attaching a guide plate having a spigot portion to a cylindrical projected portion of a solenoid coil assembly for guiding a valve portion to and away from a solenoid portion wherein a symmetrical central axis is maintained between said valve portion and said solenoid portion during said guiding of said valve portion;

providing a solenoid case having a first flange portion in said solenoid portion;

providing a valve body having a second flange portion in said valve portion;

said guide plate further comprising a third flange portion; and crimping said flange portions together.

53. The method of claim 52 wherein said solenoid case is one piece.

54. The method of claim 52 further comprising the step of providing a diaphragm having a fourth flange portion.

55. The method of claim 52 further comprising an O-ring disposed in said spigot portion.

56. The method of claim 52 wherein said controller is utilized in an internal combustion engine.

* * * * *